United States Patent
Ushiro (10) Patent No.: US 7,562,989 B2
(45) Date of Patent: Jul. 21, 2009

(54) PROJECTOR WITH DETACHABLY MOUNTED REMOTE CONTROLLER

(75) Inventor: Seimei Ushiro, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 387 days.

(21) Appl. No.: 11/287,311

(22) Filed: Nov. 28, 2005

(65) Prior Publication Data

US 2006/0114431 A1    Jun. 1, 2006

(30) Foreign Application Priority Data

Nov. 29, 2004    (JP) .............................. 2004-344409

(51) Int. Cl.
G03B 21/14 (2006.01)
G03B 21/22 (2006.01)
G03B 21/20 (2006.01)
H04N 3/22 (2006.01)
H04N 3/26 (2006.01)

(52) U.S. Cl. ........................ 353/119; 353/69; 353/85; 348/745

(58) Field of Classification Search .................. 353/30, 353/69, 70, 119, 100–102, 122, 85; 341/176; 396/59; 386/46; 348/745
See application file for complete search history.

(56) References Cited

U.S. PATENT DOCUMENTS

| | | | | |
|---|---|---|---|---|
| 4,998,125 A | * | 3/1991 | Watanabe et al. ............. | 396/59 |
| 6,409,350 B1 | * | 6/2002 | Kakimoto et al. ............. | 353/85 |
| 6,726,336 B2 | * | 4/2004 | Matsuda et al. ............. | 353/122 |
| 7,253,765 B2 | * | 8/2007 | Edwards et al. ............. | 341/176 |
| 2001/0000979 A1 | * | 5/2001 | Han et al. .................... | 358/474 |
| 2002/0082078 A1 | * | 6/2002 | Togo et al. .................... | 463/30 |
| 2003/0179211 A1 | * | 9/2003 | Wada et al. .................. | 345/589 |
| 2005/0084234 A1 | * | 4/2005 | Ejiri ............................ | 386/46 |

FOREIGN PATENT DOCUMENTS

| | | |
|---|---|---|
| JP | 2-48938 U | 4/1990 |
| JP | 07-244330 A | 9/1995 |
| JP | 11-109499 A | 4/1999 |
| JP | 3093280 U | 2/2003 |

\* cited by examiner

Primary Examiner—Melissa J Koval
(74) Attorney, Agent, or Firm—Sughrue Mion, PLLC (57) ABSTRACT

A projector comprises: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame. The projector main frame has a remote controller mounting section for detachably mounting the remote controller at a position that the mounted remote controller covers the front of the projection lens of the projector main frame.

9 Claims, 12 Drawing Sheets

PROJECTOR WITH DETACHABLY MOUNTED REMOTE CONTROLLER

BACKGROUND OF THE INVENTION

1. Field of the Invention

The present invention relates to a projector having a projector main frame for projecting an image onto a screen and a remote controller for controlling the projector main frame on a remote control basis.

2. Description of the Related Art

Hitherto, there is widely adopted technology of improving operability and utility of electronic equipment and the like using a remote controller for controlling the electronic equipment and the like on a remote control basis. For example, in a field of a camera, Japanese Utility Model Laid Open Gazette JituKai Hei. 02-048938 (pages 1-2, FIG. 1) discloses a camera comprising a camera main frame and a remote controller in which when a shutter release button provided on the remote controller is depressed, a shutter of the camera main frame is operated on a remote control basis.

However, according to the camera having the remote controller, there is a need to always carry the remote controller and thus it is bulky to carry about. Further, there is a problem that the remote controller is easy to be lost. In order to solve this problem, there is proposed a camera improved in portability through forming on a camera main frame a remote controller-dedicated storage section. However, a formation of the remote controller-dedicated storage section causes the camera to be large-sized. This feature brings about a decline in the operability of the camera.

In view of the foregoing, for example, Japanese Patent Application Laid Open Gazette TokuKai Hei. 07-244330 (pages 1-2, FIG. 1) discloses a camera in which a remote controller is incorporated into a lens cover that is detachably mounted on a camera main frame, so that a remote controller-dedicated storage section is omitted. However, also in this case, a problem that the remote controller is easy to be lost is not completely solved.

Also in case of the projector, it is considered that a provision of the remote controller makes it possible to improve operability and utility. For example, Japanese Utility Model Registration No. 3093280 discloses an image display projector in which when a remote controller operates from the rear end of the main frame of the projector, a photo detecting section receives infrared emitted, and thus it is possible to perform a remote control from the rear end of the main frame of the projector.

However, the image display projector also involves a problem that the remote controller is easy to be lost.

SUMMARY OF THE INVENTION

In view of the foregoing, it is an object of the present invention to provide a projector capable of reducing a possibility of loss of a remote controller.

To achieve the above-mentioned object, the present invention provides a projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame.

According to the projector of the present invention as mentioned above, the projector main frame has a remote controller mounting section for detachably mounting the remote controller at a position that the mounted remote controller covers the front of the projection lens of the projector main frame. This feature makes it possible that when no remote control is carried out, the remote controller is mounted on the remote controller mounting section to function it as a lens cover, and when a remote control is carried out, the lens cover (the remote controller) is removed from the remote controller mounting section to function it as the remote controller. Thus, according to the present invention, it is possible to implement a projector capable of reducing a possibility of loss of the remote controller, and in addition protecting the projection lens.

In the projector according to the present invention as mentioned above, it is acceptable that the projector has a power source control section in which when the remote controller is mounted on the remote controller mounting section, a power supply to the projector main frame is turned off.

According to the arrangement of the projector as mentioned above, mounting of the remote controller on the remote controller mounting section makes it possible to automatically turn off the power source of the projector main frame, and thus it is possible to prevent an operator from forgetting to turn off the power source of the projector main frame, and also improve utility of the projector.

In the projector according to the present invention as mentioned above, it is acceptable that the remote controller has a medium drive in which a portable storage medium storing an image is detachably mounted and is accessed, and a transmission section wherein in a state that the remote controller is removed from the remote controller mounting section, an image read from the portable storage medium mounted on the medium drive is transmitted to the projector main frame, and that the projector main frame has a receiving section for receiving the image transmitted from the remote controller to store the image in the memory.

According to the arrangement of the projector as mentioned above, the use of the remote controller in the state that the remote controller is removed from the remote controller mounting section makes it possible to read the image stored in the portable storage medium and transmit the same to the projector main frame, and thus the read of the image is easy. This feature makes it possible to improve operability and utility of the projector.

In the projector according to the present invention as mentioned above, it is acceptable that the remote controller has a medium drive in which a portable storage medium storing an image is detachably mounted and is accessed, and a transmission section wherein in a state that the remote controller is mounted on the remote controller mounting section, an image read from the portable storage medium mounted on the medium drive is transmitted to the projector main frame, and that the projector main frame has an image receiving section for receiving the image transmitted from the remote controller to store the image in the memory.

According to the arrangement of the projector as mentioned above, the image read from the portable storage medium mounted on the medium drive can be transmitted to the projector main frame. This feature makes it possible to further improve operability and utility of the projector.

In the projector according to the present invention as mentioned above, it is acceptable that the remote controller has a secondary battery for operating the remote controller, and the projector main frame has a charger section for charging the secondary battery of the remote controller mounted on the remote controller mounting section.

According to the arrangement of the projector as mentioned above, the charger section automatically charges the secondary battery of the remote controller. This feature makes it possible to further improve operability and utility of the projector.

In the projector according to the present invention as mentioned above, it is acceptable that the remote controller has: an imaging device; a focusing detection section in which an image on a screen projected from the projector main frame is formed on the imaging device to obtain an image signal representative of the image, and focusing of the image on the screen is detected in accordance with the image signal; and a focusing state transmission section for transmitting to the projector main frame information representative of the focusing state detected by the focusing detection section, and that the projector main frame has a focusing control section for driving at least a part of construction element of the projection lens in accordance with information representative of the focusing state transmitted from the remote controller so as to focus the image projected onto the screen.

According to the arrangement of the projector as mentioned above, it is possible to readily perform the focusing operation for the image projected onto the screen. This feature makes it possible to further improve operability and utility of the projector.

In the projector according to the present invention as mentioned above, it is acceptable that the remote controller has: an imaging device; a distortion detection section in which an image on a screen projected from the projector main frame is formed on the imaging device to obtain an image signal representative of the image, and a keystone distortion of the image on the screen is detected in accordance with the image signal; and a distortion state transmission section for transmitting to the projector main frame information representative of a keystone distortion state detected by the distortion detection section, and that the projector main frame has a keystone correction section for correcting the keystone distortion of the image on the screen.

According to the arrangement of the projector as mentioned above, it is possible to readily perform the keystone distortion-correcting operation for the image projected onto the screen. This feature makes it possible to further improve operability and utility of the projector.

In the projector according to the present invention as mentioned above, it is acceptable that the remote controller has an imaging device, and the transmission section transmits an image imaged by the imaging device to the projector main frame.

According to the arrangement of the projector as mentioned above, it is possible that the transmission section transmits the image imaged by the imaging device to the projector main frame, the image received by the receiving section is stored in the memory, and the image stored in the memory is projected via the projection lens onto the screen. This feature makes it possible to further improve operability and utility of the projector.

DETAILED DESCRIPTION OF PREFERRED EMBODIMENTS

Embodiments of the present invention will be described with reference to the accompanying drawings.

Figure 1:
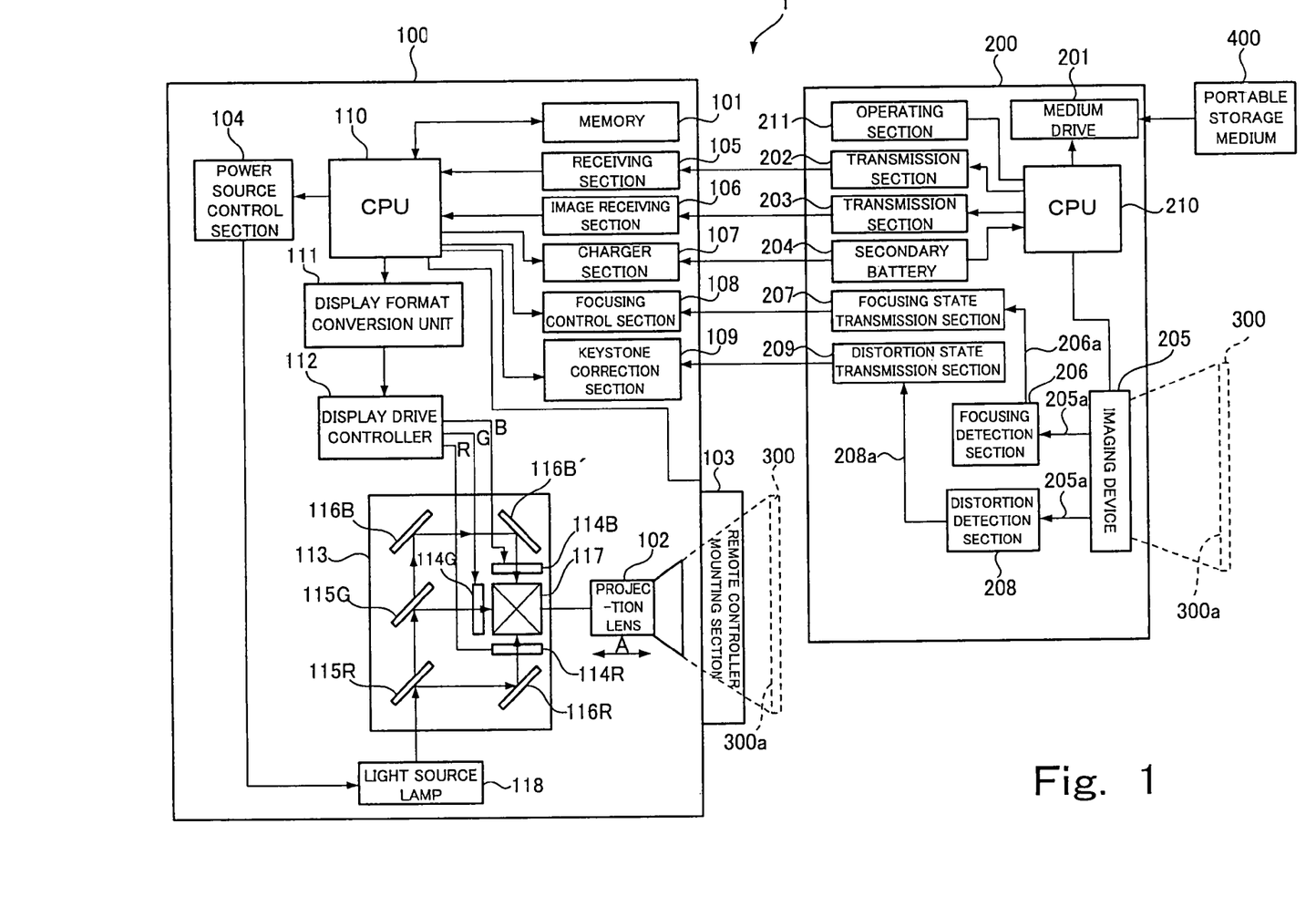
FIG. 1 is a block diagram of a projector according to an embodiment of the present invention.

FIG. 1 is a block diagram of a projector according to an embodiment of the present invention.

As shown in FIG. 1, a projector 1 comprises: a projector main frame 100 having a memory 101 for storing an image in form of data and a projection lens 102 for projecting the image, in which the image stored in the memory 101 is read and visualized, so that the visualized image is projected via the projection lens 102 onto a screen 300; and a remote controller 200 for performing a remote control of the projector main frame 100. The projector main frame 100 has a remote controller mounting section 103 for detachably mounting the remote controller 200 at a position that the mounted remote controller 200 covers the front of the projection lens 102 of the projector main frame 100.

Now there will be explained a basic projection operation of the projector main frame 100. The projector main frame 100 has a CPU 110 for controlling operation of every element of the projector main frame 100. The CPU 110 provides such a control that image data stored in the memory 101 is read and converted into a predetermined frame memory data, and then outputted to a display format conversion unit 111. The display format conversion unit 111 converts the received image data into a display format adapted to a display drive controller 112, for example, which is separated into three colors (red, green, and blue) of primary color signals R(red), G(green) and B(blue), and then outputted to a display device 113.

The device 113 has, for example, three colors of liquid crystal panels 114R, 114G, and 114B. Light beam emitted from a light source lamp 118 is projected, for example, to a dichroic mirror 115R that separates a red light beam. The light beam of red reflected from the dichroic mirror 115R is reflected on a mirror 116R and then projected to the liquid crystal panel 114R for displaying a red of primary color signal R. In the liquid crystal panel 114R, the projected light beam is modulated in accordance with the primary color signal R to form a projected image of the primary color signal R.

A light beam transmitted through the dichroic mirror 115R is projected to the dichroic mirror 115G that separates a green light beam. The light beam of green reflected from the dichroic mirror 115G is projected to the liquid crystal panel 114G for displaying a green of primary color signal G. A light beam of green transmitted through the dichroic mirror 115G is reflected on mirrors 116B and 116B' and projected to a liquid crystal panel 114B for displaying a green of primary color signal B. The liquid crystal panels 114G and 114B form a projected image modulated in accordance with the primary color signals G and B.

Projected image lights of the primary color signals R, G and B, which are modulated in the liquid crystal panels 114R, 114G and 114B, respectively, are projected to a cross prism 117 to combine those projected image lights with one another, so that thus combined projected image light is projected via a projection lens 102 to the screen 300. The projection lens 102 has a first movable portion that is movable by a motor in an optical axis direction A. A movement of the first movable portion makes it possible to perform focusing. The projection lens 102 has further a second movable portion that is movable by two motors in two directions intersecting the optical axis direction A, the second movable portion being different from the first movable portion. A movement of the second movable portion makes it possible to perform the keystone correction. Details of focussing and the keystone correction will be described later.

In the manner as mentioned above, the three colors (red, green, and blue) of primary color signals R(red), G(green) and B(blue), which are formed from the image data stored in the memory 101, are displayed on the liquid crystal panels 114R, 114G and 114B, respectively, so that the projected image lights modulated by the display are combined and then projected via the projection lens 102 to the screen 300.

Figure 2:
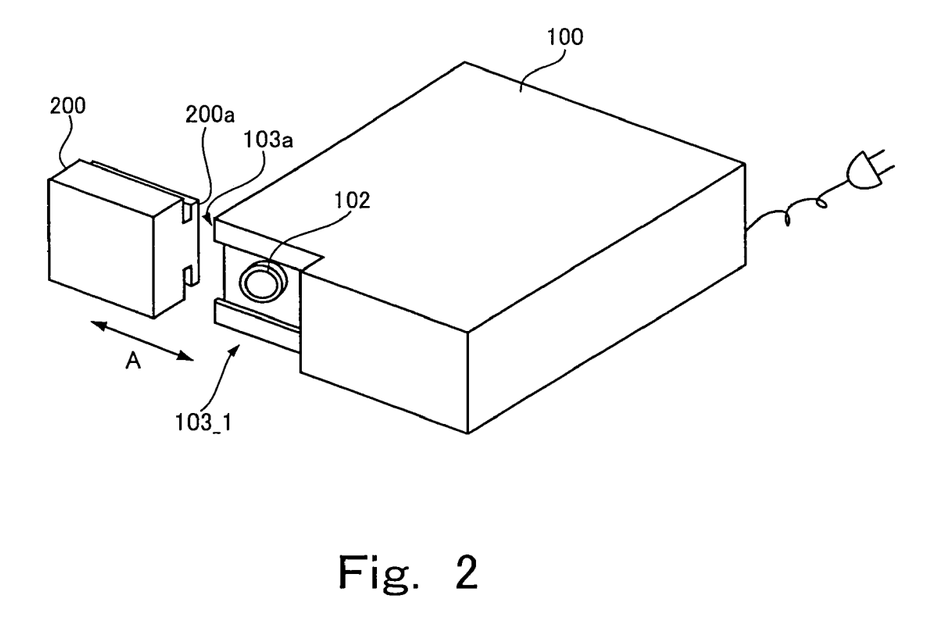
FIG. 2 is a conceptual view of an example of a remote controller mounting section according to a first embodiment of the present invention.

FIG. 2 is a conceptual view of an example of a remote controller mounting section according to a first embodiment of the present invention.

As shown in FIG. 2, the projector main frame 100 according to the first embodiment has a remote controller mounting section 103_1 adapted to detachably mount the remote controller 200 at the position wherein the mounted remote controller 200 covers the front of the projection lens 102 of the projector main frame 100. The remote controller mounting section 103_1 has a groove section 103a that engages with a projection 200a shaped as a figure T in section, which is provided at the side of the remote controller 200.

When the projection 200a of the remote controller 200 is engaged with the groove section 103a of the projector main frame 100 and the remote controller 200 is slid in a direction of an arrow A, it is possible to mount and remove the remote controller 200 on and from the projector main frame 100, respectively.

Figure 3:
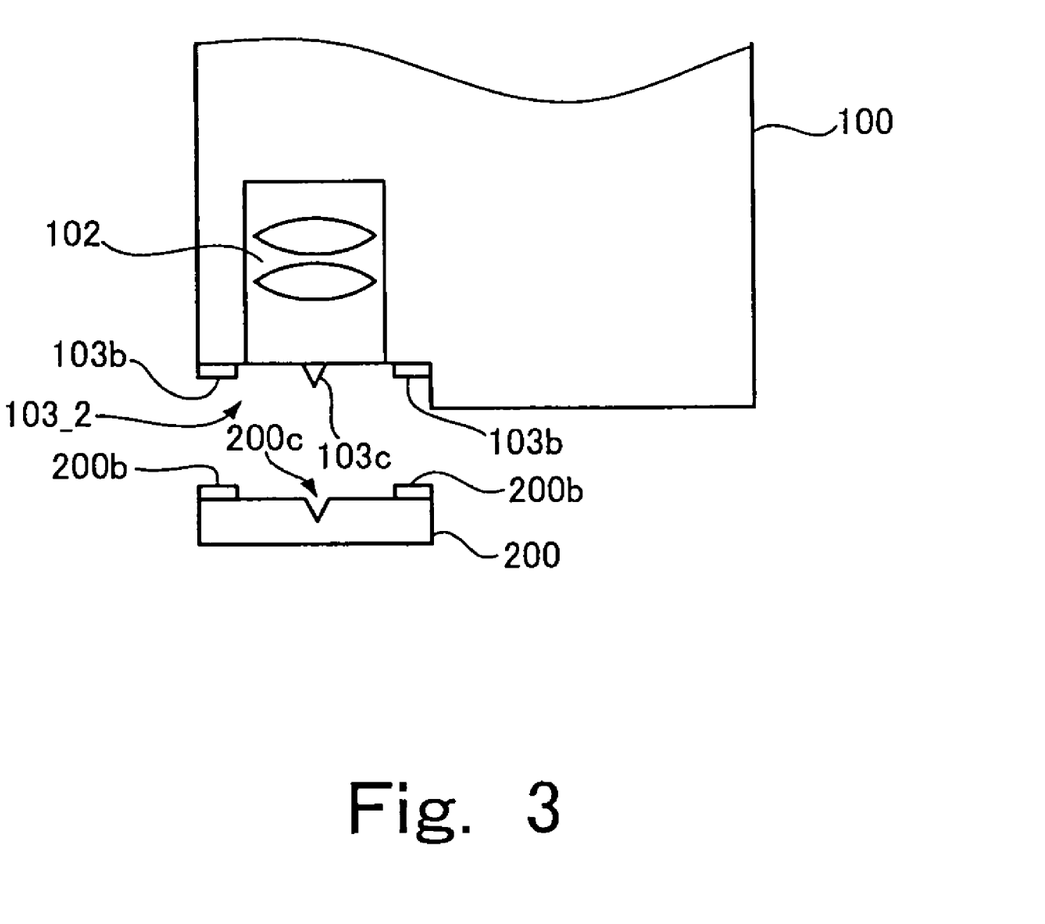
FIG. 3 is a schematic diagram of another example of a remote controller mounting section provided on a projector main frame according to a first embodiment of the present invention.

FIG. 3 is a schematic diagram of another example of a remote controller mounting section provided on a projector main frame according to a first embodiment of the present invention.

As seen from FIG. 3, the projector main frame 100 according to the first embodiment has a remote controller mounting section 103_2 adapted to detachably mount the remote controller 200 at the position wherein the mounted remote controller 200 covers the front of the projection lens 102 of the projector main frame 100. The remote controller mounting section 103_2 has a magnetic section 103b at the position facing a magnetic section 200b provided at the side of the remote controller 200, and a convex section 103c adapted to engage with a concave portion 200c provided at the side of the remote controller 200.

When the concave portion 200c of the remote controller 200 is engaged with the convex section 103c of the projector main frame 100, the magnetic force makes it possible to surely mount the remote controller 200 on the projector main frame 100. Further, a separation of both the projector main frame 100 and the remote controller 200 by the force exceeding the magnetic force of the magnet makes it possible to easily remove the remote controller 200 from the projector main frame 100.

Figure 4:
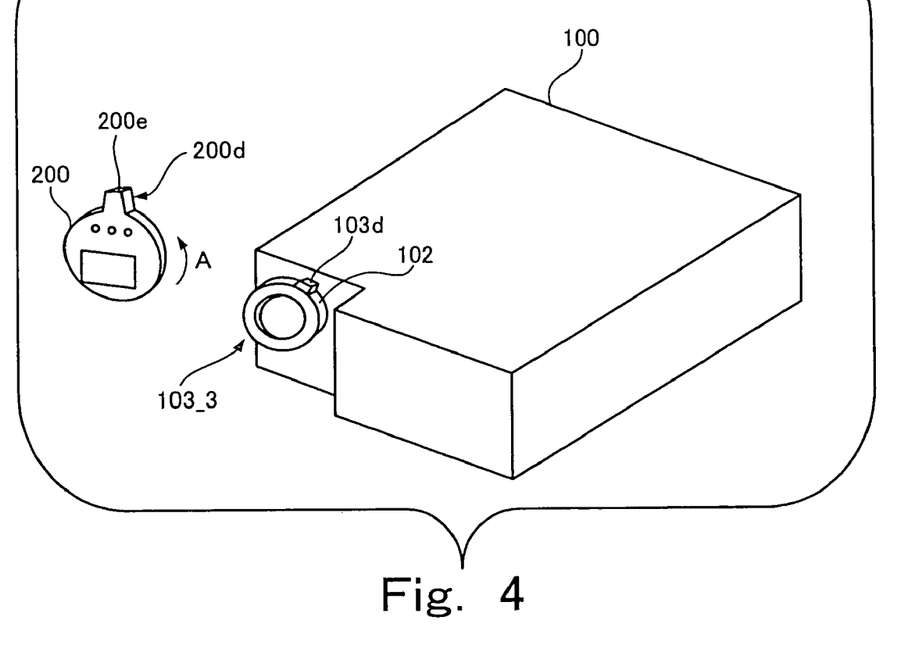
FIG. 4 is a schematic diagram of further example of a remote controller mounting section provided on a projector main frame according to a first embodiment of the present invention.

FIG. 4 is a schematic diagram of further example of a remote controller mounting section provided on a projector main frame according to the first embodiment of the present invention.

As seen from FIG. 4, the projector main frame 100 according to the first embodiment has a remote controller mounting section 103_3 adapted to detachably mount the remote controller 200 at the position wherein the mounted remote controller 200 covers the front of the projection lens 102 of the projector main frame 100.

The remote controller mounting section 103_3 has a projection 103d. On the other hand, the remote controller 200 has an engagement section 200e at the back of which there is formed a concave portion 200d to be engaged with the projection 103d. Thus, when the concave portion 200d of the remote controller 200 is engaged with the projection 103d of the projector main frame 100 and is rotated in a direction of an arrow A, it is possible to surely mount the remote controller 200 on the projector main frame 100. When the remote controller 200 is rotated in a direction opposite to the arrow A, the engagement is disengaged, so that the remote controller 200 can be easily removed from the projector main frame 100.

Figure 5:
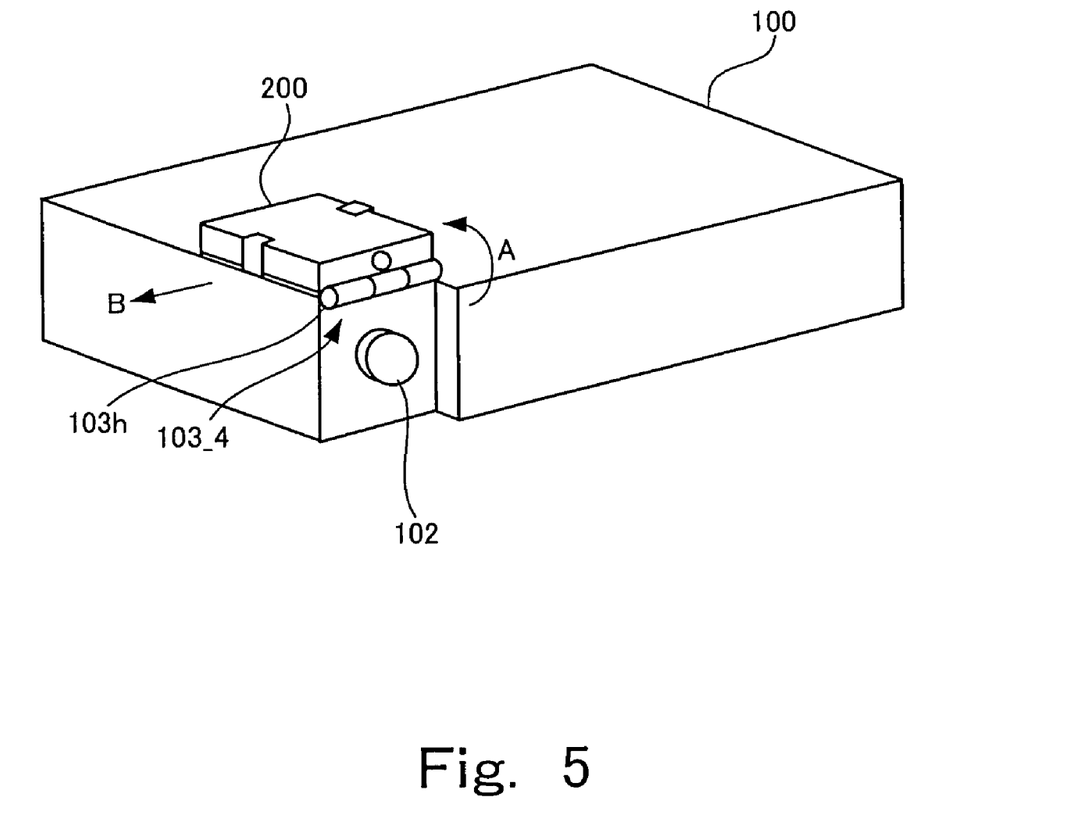
FIG. 5 is a schematic diagram of still further example of a remote controller mounting section provided on a projector main frame according to a first embodiment of the present invention.

FIG. 5 is a schematic diagram of still further example of a remote controller mounting section provided on a projector main frame according to a first embodiment of the present invention.

As seen from FIG. 5, the projector main frame 100 according to the first embodiment has a remote controller mounting section 103_4 adapted to detachably mount the remote controller 200 at the position wherein the mounted remote controller 200 covers the front of the projection lens 102 of the projector main frame 100.

The remote controller mounting section 103_4 has a hinge 103h for coupling the projector main frame 100 with the remote controller 200. In FIG. 5, there is shown a state that the remote controller 200 is rotated from a position covering the front of the projection lens 102 in a direction of an arrow A by 270 degree so as to be moved in a position that the front of the projection lens 102 is released. According to the state illustrated in FIG. 5, when the remote controller 200 is slid in a direction of an arrow B for example, the coupling of the remote controller 200 with the projector main frame 100 by the hinge 103h can be released.

Next, there will be explained a second embodiment of the present invention.

As shown in FIG. 1, the projector 1 according to the second embodiment has a power source control section 104 in which when the remote controller 200 is mounted on the remote controller mounting section 103, the power supply to every element of the projector main frame 100 is turned off.

Figure 6:
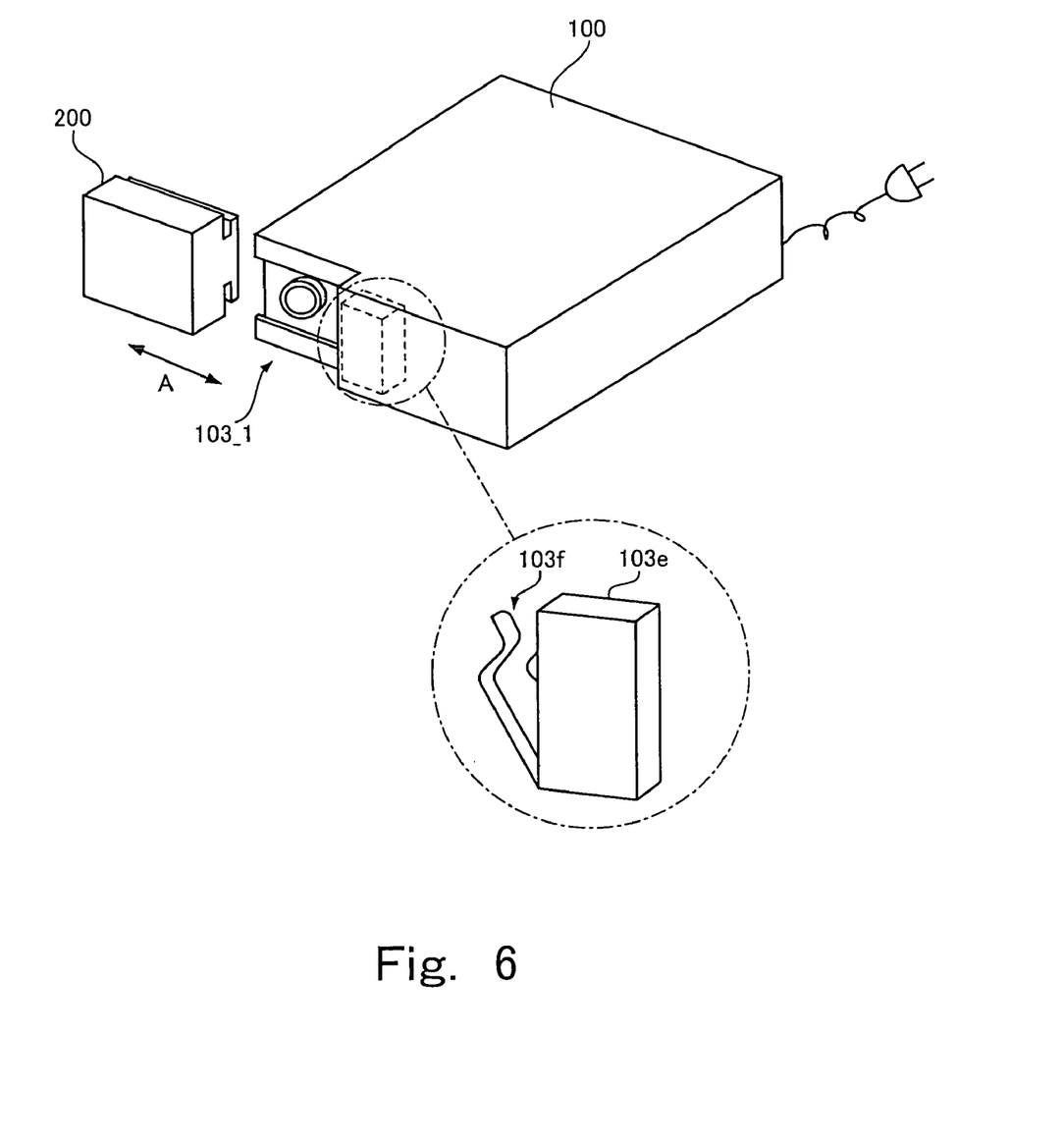
FIG. 6 is a schematic diagram of an example of a power switch provided on a projector main frame according to a first embodiment of the present invention.

FIG. 6 is a schematic diagram of an example of a power switch provided on a projector main frame according to a first embodiment of the present invention.

According to the example shown in FIG. 6, there is provided a power source switch 103e having a contact 103f, which turns on and off when the remote controller 200 is detached and mounted at the position closed to the remote controller mounting section 103_1 of the projector main frame 100 shown in FIG. 2.

The power source switch 103e constitutes a part of the power source control section (cf. 104 in FIG. 1) referred to in the present invention. According to the power source switch 103e, when the remote controller 200 is slid in a predetermined direction A to be detached and mounted from and on the projector main frame 100, so that the power source switch 103e turns on and off, the power supply to every element of the projector main frame 100 including light source lamp 118 is turned on and off.

Figure 7:
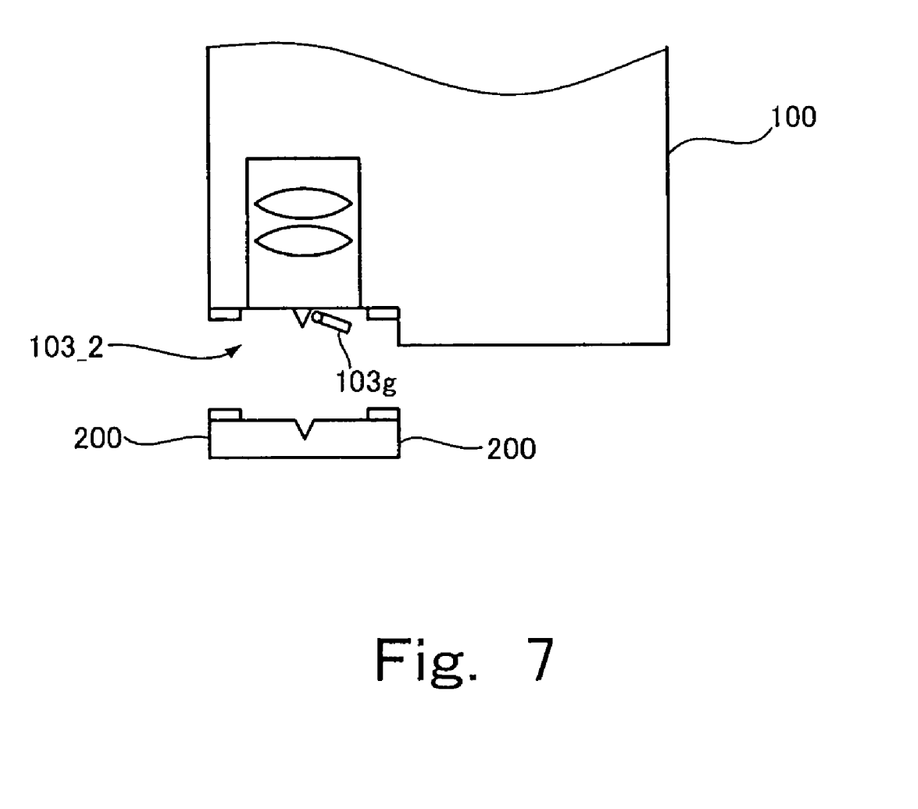
FIG. 7 is a schematic diagram of another example of a power switch provided on a projector main frame according to a second embodiment of the present invention.

FIG. 7 is a schematic diagram of another example of a power switch provided on a projector main frame according to a second embodiment of the present invention.

As seen from FIG. 7, according to this embodiment, the remote controller mounting section 103_2 of the projector main frame 100 shown in FIG. 3 is provided with a reed switch 103g that turns on and off when the remote controller 200 is detached and mounted from and on the projector main frame 100. When the reed switch 103g turns on and off in accordance with detachment and mounting of the remote controller 200, the power source control section 104 (cf. FIG. 1) turns on and off the power supply to every element of the projector main frame 100 including light source lamp 118.

It is acceptable that the rotary type of remote controller mounting section 103_3 shown in FIG. 4 is provided with a switch (not illustrated), which is turned on and off by an engagement section 200e when the remote controller 200 is detached and mounted from and on the projector main frame 100 to rotate in the direction of the arrow A, and when the switch turns on and off, the power source control section 104 (cf. FIG. 1) turns on and off the power supply to every element of the projector main frame 100 including light source lamp 118.

Next, there will be explained the fundamental operation of a remote controller that controls the projector main frame in the respective embodiment of the present invention as mentioned above.

Figure 8:
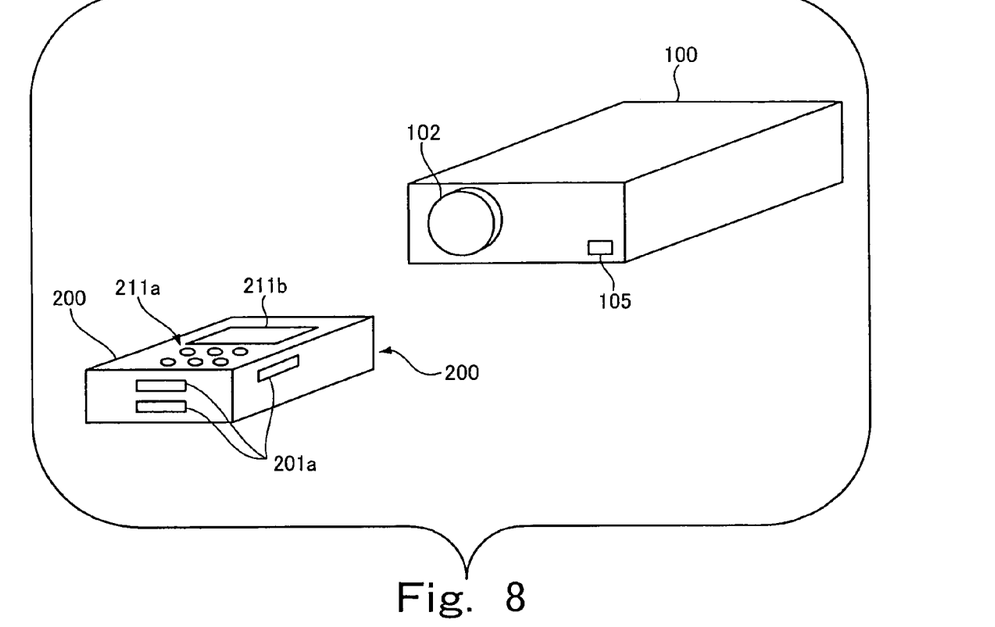
FIG. 8 is a schematic diagram of a remote controller common to the respective embodiment of the present invention.

FIG. 8 is a schematic diagram of a remote controller common to the respective embodiment of the present invention.

As seen from FIG. 8, the remote controller 200 has an operating section 211 (cf. FIG. 1) having operating buttons 211a for performing a remote control for turn-on and off of the power source of the projector main frame 100, an image selection, a focusing control and a projection operation, and the like, and a display screen 211b by an LCD (Liquid Crystal Display), and medium mounting slots 201a on which an associated portable storage medium is mounted.

An operator of the projector displays on the display screen 211b image data read from the portable storage medium mounted on the medium mounting slot 201a, and operates the operating buttons 211a while looking at the display screen 211b, so that the operator can perform a remote control for the projection operation by the projector main frame 100.

Figure 9:
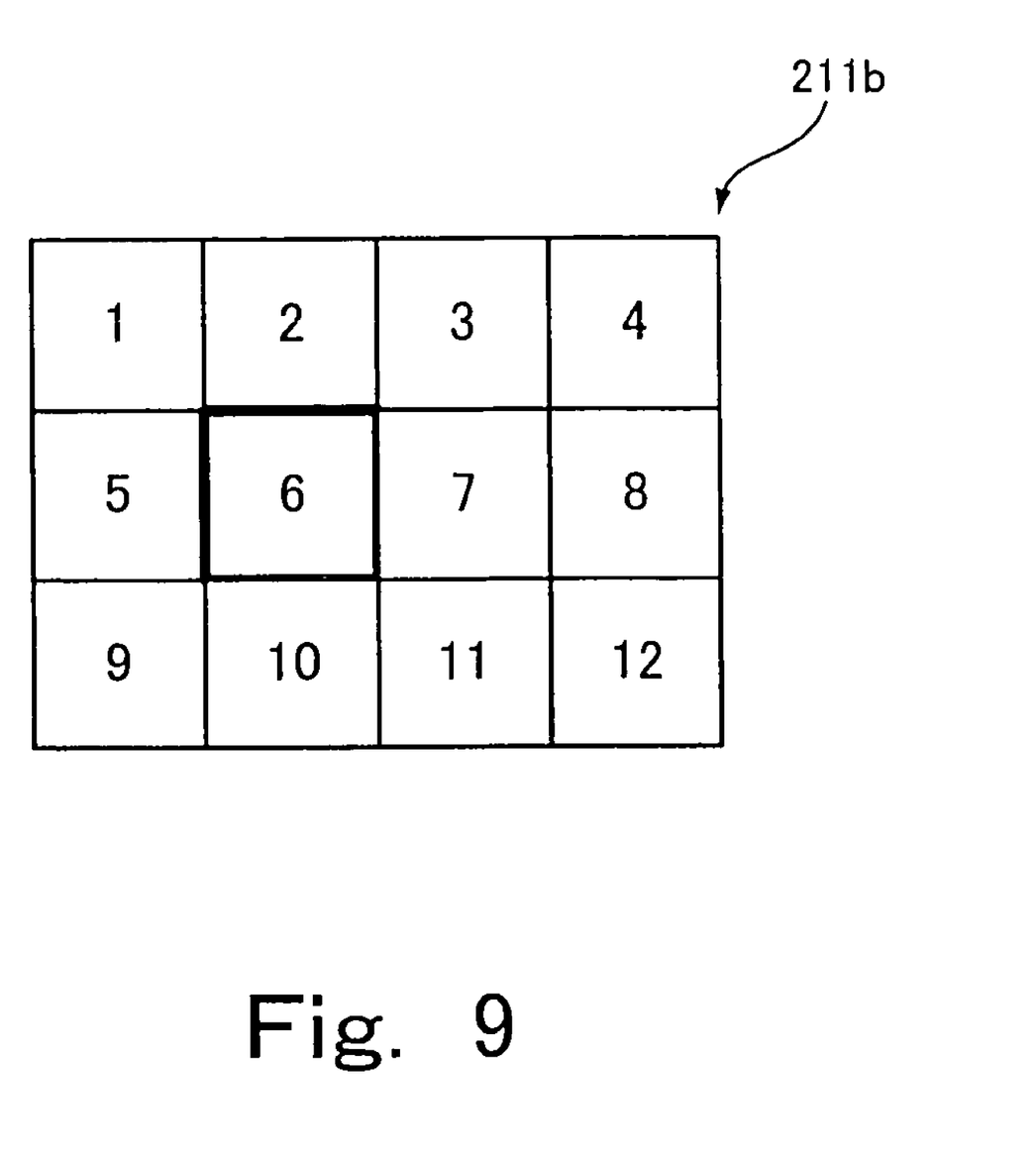
FIG. 9 is a schematic diagram of a display screen of a remote controller according to the respective embodiment of the present invention.

FIG. 9 is a schematic diagram of a display screen of a remote controller according to the respective embodiment of the present invention.

As seen from FIG. 9, the display screen 211b can display data numbers of image data to be projected by the projector main frame 100, file names, or thumbnail. When the operating button 211a (cf. FIG. 8) is depressed, it is possible to select image data associated with the data number 6, for example, as encircled in FIG. 9.

The remote controller 200 shown in FIG. 8 has the medium mounting slot 201a on which a portable storage medium 400 is mounted, and in addition, as shown in FIG. 1, inside the remote controller 200, there are provided a CPU 210 for controlling every section of the remote controller 200, and a secondary battery 204 for supplying an electric power to every section of the remote controller 200.

When an operator operates the operating button 211a (cf. FIG. 9) of the remote controller 200, the CPU 210 generates a remote control signal and transmits the remote control signal from a transmission section 202 (cf. FIG. 1) to the projector main frame 100. A receiving section 105 of the projector main frame 100 receives the transmitted remote control signal, and the CPU 110 (cf. FIG. 1) of the projector main frame 100 interprets the remote control signal, so that an operator's instruction is executed.

Next, there will be explained a third embodiment of the present invention.

According to the projector 1 of the third embodiment has, as shown in FIG. 1, the remote controller 200 has a medium drive 201 in which the portable storage medium 400 storing an image is detachably mounted and is accessed, and the transmission section 202 wherein in a state that the remote controller 200 is removed from the remote controller mounting section 103, an image read from the portable storage medium 400 mounted on the medium drive 201 is transmitted to the projector main frame 100. On the other hand, the projector main frame 100 has the receiving section 105 for receiving the image transmitted from the remote controller 200 to store the same in the memory 101.

In this manner, according to the projector 1 of the third embodiment, the transmission section 202 and the receiving section 105 can perform transmission and receipt of images in the state that the remote controller 200 is removed from the remote controller mounting section 103. This feature makes it possible to obtain a projector having an excellent operability.

Any one is acceptable, as the portable storage medium 400 and the medium drive 201, which are a portable storage medium that is concerned with magnetic or optical storage, for example, a memory card, and the associated medium drive, respectively.

Further, as the transmission section 202 and the receiving section 105, it is acceptable to adopt any one of an infrared communication system, an ultrasonic communication system, and a radio communication system.

Next, there will be explained a fourth embodiment of the present invention.

According to the projector 1 of the fourth embodiment, as shown in FIG. 1, the remote controller 200 has the medium drive 201 in which the portable storage medium 400 storing an image is detachably mounted and is accessed, and a transmission section 203 wherein in a state that the remote controller 200 is mounted on the remote controller mounting section 103, an image read from the portable storage medium 400 mounted on the medium drive 201 is transmitted to the projector main frame 100. On the other hand, the projector main frame 100 has an image receiving section 106 for receiving the image transmitted from the remote controller 200 to store the same in the memory 101.

Thus, in the state that the remote controller 200 is mounted on the remote controller mounting section 103, the transmission section 203 is coupled via the remote controller mounting section 103 with the image receiving section 106, so that the image read from the portable storage medium 400 is automatically transmitted to the projector main frame 100. This feature makes it possible to obtain a projector having an excellent operability.

Next, there will be explained a fifth embodiment of the present invention.

According to the projector 1 of the fifth embodiment, as shown in FIG. 1, the remote controller 200 has the secondary battery 204 for operating the remote controller 200. On the other hand, the projector main frame 100 has a charger section 107 for charging the secondary battery 204 of the remote controller 200 mounted on the remote controller mounting section 103.

Thus, according to the fifth embodiment, the secondary battery 204 of the remote controller 200 is automatically charged while the remote controller 200 is mounted on the projector main frame 100. This feature makes it possible to obtain a projector excellent in operability.

Next, there will be explained a sixth embodiment of the present invention.

According to the projector 1 of the sixth embodiment, as shown in FIG. 1, the remote controller 200 has: an imaging device 205; a focusing detection section 206 in which an image 300a on a screen 300 projected from the projector main frame 100 is formed on the imaging device 205 to obtain an image signal 205a representative of the image 300a, and the focusing of the image 300a on the screen 300 is detected in accordance with the image signal 205a; and a focusing state transmission section 207 for transmitting to the projector main frame 100 information 206a representative of the focusing state detected by the focusing detection section 206. The projector main frame 100 has a focusing control section 108 for driving at least a part of construction element of the projection lens 102 in accordance with the information 206a representative of the focusing state transmitted from the remote controller 200 so as to focus the image 300a projected onto the screen 300.

More in detail, when an operator depresses a predetermined operating button 211a provided on the remote controller 200 (cf. FIG. 8), the imaging device 205 (cf. FIG. 1) images the image 300a projected onto the screen 300, and transmits the image signal 205a to the focusing detection section 206. The focusing detection section 206 detects the focusing of the image 300a, and the focusing state transmission section 207 transmits the information 206a representative of the focusing state to the focusing control section 108 of the projector main frame 100.

As the information 206a representative of the focusing state, it is acceptable to use, for example, contrast of the image 300a. More in detail, in this case, there is determined a difference in image density between adjacent pixels as to the whole pixels of the image 300a, and the total of the absolute values can be used as the image contrast. The focusing control section 108 controls the focusing of the image 300a projected onto the screen 300 in such a manner that at least a part of construction elements of the projection lens 102 is driven so that the information 206a representative of the focusing state transmitted from the remote controller 200, for example, the image contrast, is the maximum.

Next, there will be explained a seventh embodiment of the present invention.

According to the projector 1 of the seventh embodiment, as shown in FIG. 1, the remote controller 200 has: the imaging device 205; a distortion detection section 208 in which an image 300a on a screen 300 projected from the projector main frame 100 is formed on the imaging device 205 to obtain the image signal 205a representative of the image 300a, and a keystone distortion of the image 300a on the screen 300 is detected in accordance with the image signal 205a; and a distortion state transmission section 209 for transmitting to the projector main frame 100 information 208a representative of the keystone distortion state detected by the distortion detection section 208. The projector main frame 100 has a keystone correction section 109 for correcting the keystone distortion of the image 300a on the screen 300.

Figure 10:
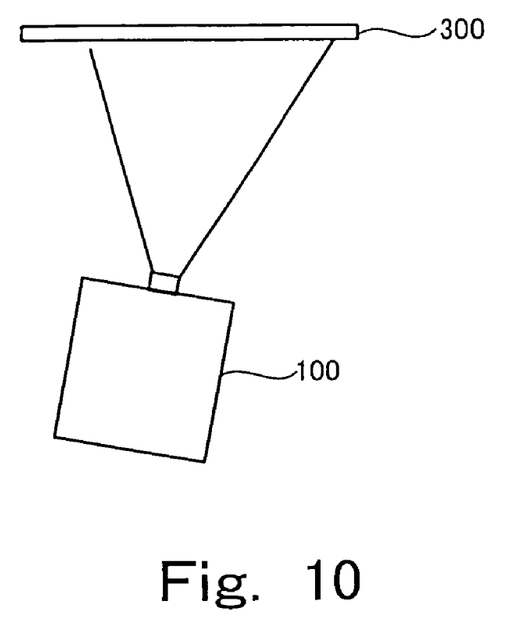
FIG. 10 is an illustration showing a relative positional relation between a screen and a projector.
Figure 11:
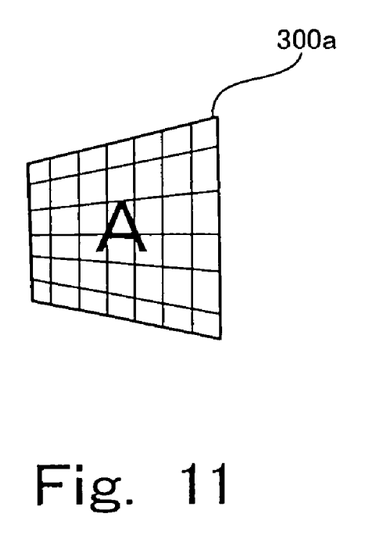
FIG. 11 is a view showing a state in which an image projected on a screen brings about a keystone distortion.

FIG. 10 is an illustration showing a relative positional relation between a screen and a projector. FIG. 11 is a view showing a state in which an image projected on a screen brings about a keystone distortion.

Generally, in an apparatus for projecting an image onto a screen, such as a liquid crystal projector and a film projector, as shown in FIG. 10, in some relative positional relation of the projector main frame 100 to the screen 300, it happens that an image 300a projected onto the screen 300 is distorted as a trapezoid, as shown in FIG. 11.

Figure 12:
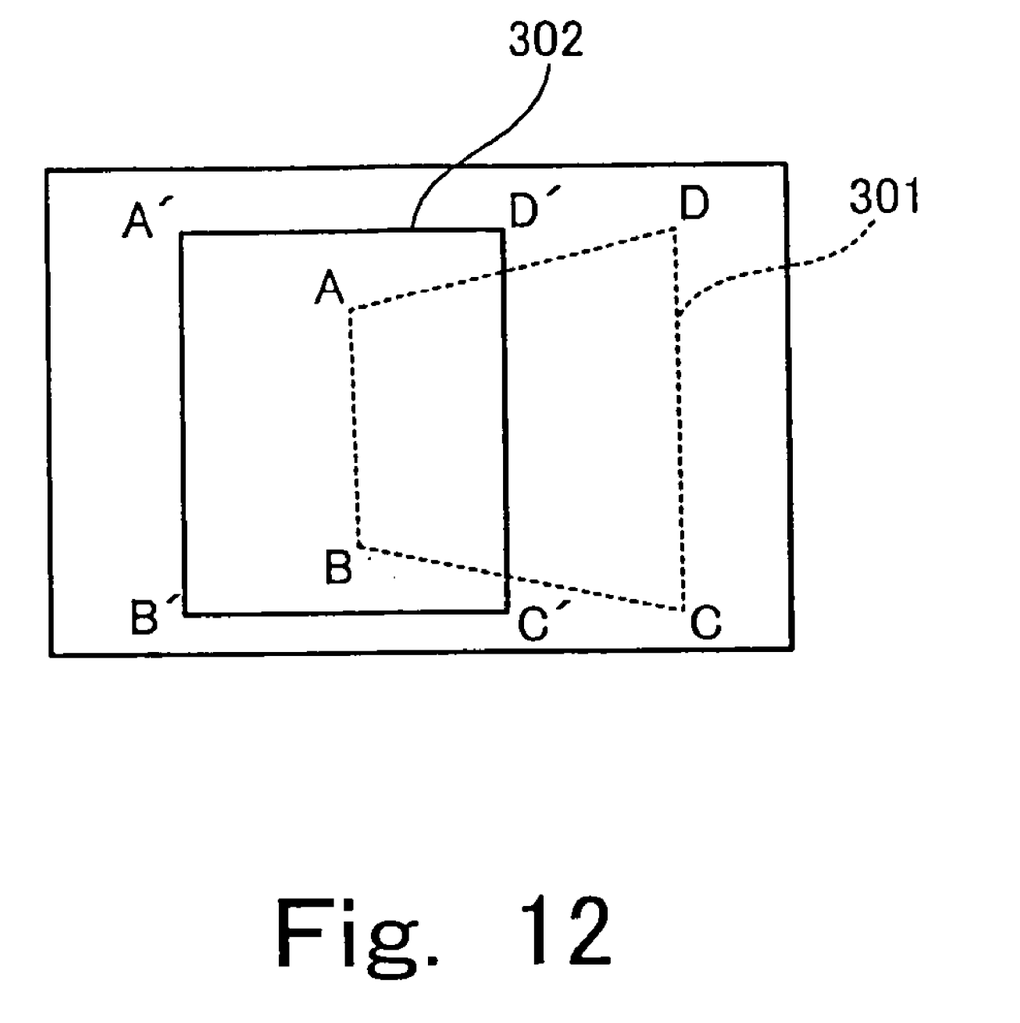
FIG. 12 is a schematic diagram useful for understanding a keystone correction method in a projector according to a seventh embodiment of the present invention.

FIG. 12 is a schematic diagram useful for understanding a keystone correction method in a projector according to a seventh embodiment of the present invention.

As a keystone correction method of correcting the keystone distortion, there are proposed various schemes. There are known, for example, a mechanical method in which a part of lens groups constituting a projection lens is driven in a direction intersecting an optical axis of the lens, and a method of electronically correcting image data using an image processing apparatus.

According to the keystone correction method of the present embodiment, for example, as shown by a broken line in FIG. 12, there are detected coordinates A, B, C and D of four corners of an external form of an image 301 that brings about a keystone distortion, and an image processing apparatus is used to perform a coordinate transformation for pixels of the image 301 in its entirety so that the coordinates A, B, C and D become coordinates A', B', C' and D' of four corners of a regular quadrangle, and thus it is possible to obtain a proper image 302.

More in detail, when an operator depresses a predetermined operating button 211a provided on the remote controller 200 (cf. FIG. 8), the imaging device 205 (cf. FIG. 1) images the image 300a projected onto the screen 300, and transmits the image signal 205a to the distortion detection section 208. The distortion detection section 208 detects the distortion state of the image 300a, and the distortion state transmission section 209 transmits the information 208a representative of the distortion state to the keystone correction section 109 of the projector main frame 100.

The keystone correction section 109 performs a coordinate transformation for pixels of the image in its entirety in accordance with the information 208a representative of the distortion state, which is transmitted from the remote controller 200, so that a distorted image 301 as shown with the broken line in FIG. 12 becomes a proper image 302. Thus, it is possible to correct the keystone distortion of the image 300a projected onto the screen 300.

Next, there will be explained an eighth embodiment of the present invention.

According to the projector 1 of the eighth embodiment, the remote controller 200 (cf. FIG. 1) has the imaging device 205, and the transmission section 202 transmits the image imaged by the imaging device 205 to the projector main frame 100.

Figure 13:
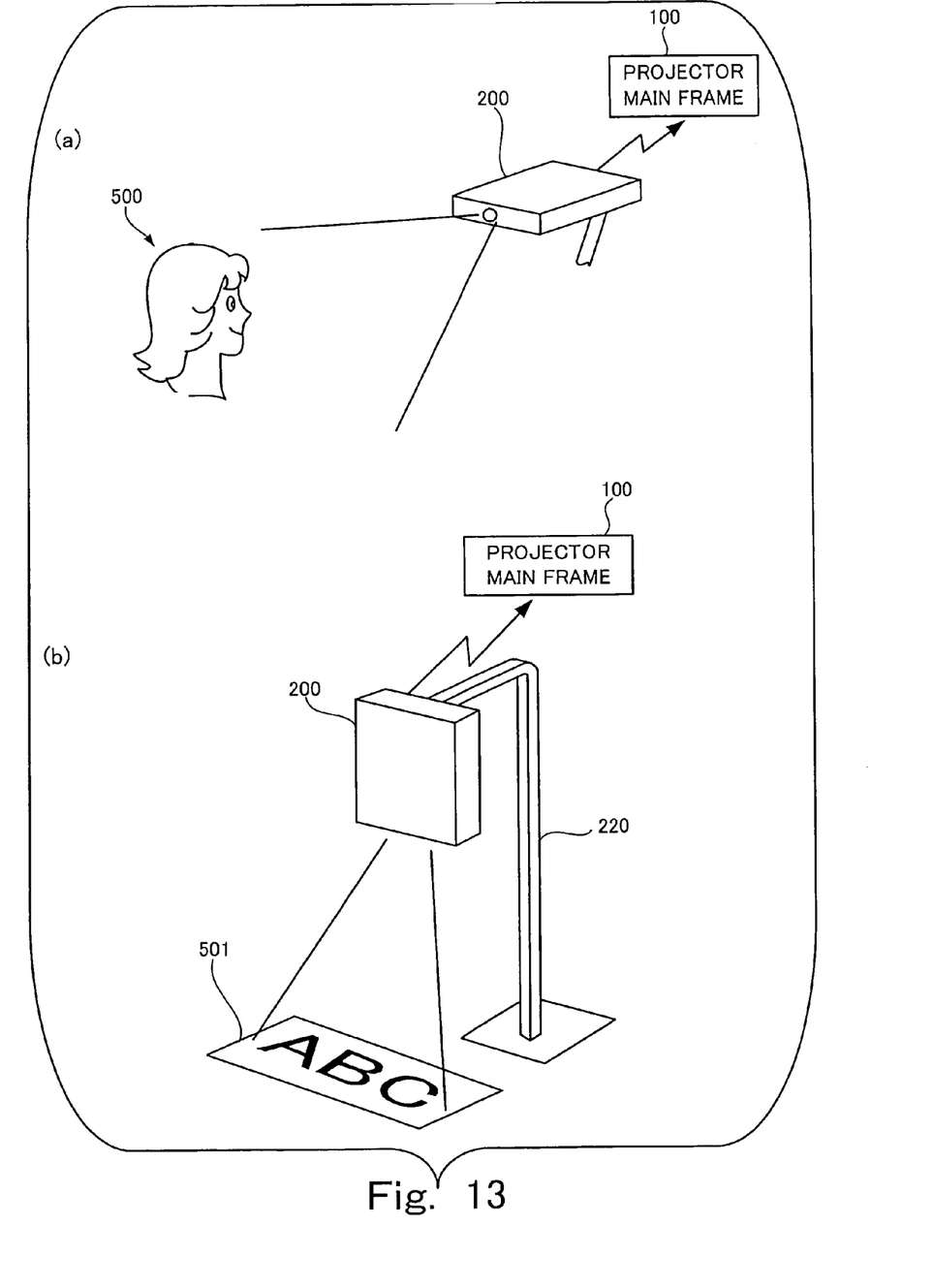
FIG. 13 is an illustration useful for understanding an operation of a projector according to a eighth embodiment of the present invention.

FIG. 13 is an illustration useful for understanding an operation of a projector according to a eighth embodiment of the present invention.

As shown in a part (a) of FIG. 13, the imaging device 205 (cf. FIG. 1), which is incorporated in the remote controller 200 removed from the projector main frame 100, is used to image a subject 500 such as a person, and the transmission section 202 (cf. FIG. 1) is used to transmit the image to the receiving section 105 (cf. FIG. 1). The image received by the receiving section 105 is stored in the memory 101 (cf. FIG. 1). The image stored in the memory 101 is visualized and then projected via the projection lens 102 (cf. FIG. 1) onto the screen (cf. FIG. 1).

Incidentally, as shown in a part (b) of FIG. 13, it is acceptable that the remote controller 200, which is removed from the projector main frame 100, is mounted on a stand 220 as illustrated in the part (b) of FIG. 13, so that a subject 501 such as documents can be imaged.

Thus, according to the projectors of the present embodiments, it is possible to image a subject by a remote controller, so that the image of the subject is transmitted to the projector main frame to be projected on a screen.

As mentioned above, according to the present invention, it is possible to implement a projector capable of reducing a possibility of loss of a remote controller.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, and wherein the projector has a power source control section in which when the remote controller is mounted on the remote controller mounting section, a power supply to the projector main frame is turned off.

2. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, wherein the remote controller has a medium drive in which a portable storage medium storing an image is detachably mounted and is accessed, and a transmission section wherein in a state that the remote controller is removed from the remote controller mounting section, an image read from the portable storage medium mounted on the medium drive is transmitted to the projector main frame, and wherein the projector main frame has a receiving section for receiving the image transmitted from the remote controller to store the image in the memory.

3. A projector according to claim 2, wherein the remote controller has an imaging device, and the transmission section transmits an image imaged by the imaging device to the projector main frame.

4. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, wherein the remote controller has a medium drive in which a portable storage medium storing an image is detachably mounted and is accessed, and a transmission section wherein in a state that the remote controller is mounted on the remote controller mounting section, an image read from the portable storage medium mounted on the medium drive is transmitted to the projector main frame, and wherein the projector main frame has an image receiving section for receiving the image transmitted from the remote controller to store the image in the memory.

5. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, and wherein the remote controller has a secondary battery for operating the remote controller, and the projector main frame has a charger section for charging the secondary battery of the remote controller mounted on the remote controller mounting section.

6. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, wherein the remote controller has: an imaging device; a focusing detection section in which an image on a screen projected from the projector main frame is formed on the imaging device to obtain an image signal representative of the image, and focusing of the image on the screen is detected in accordance with the image signal; and a focusing state transmission section for transmitting to the projector main frame information representative of the focusing state detected by the focusing detection section, and wherein the projector main frame has a focusing control section for driving at least a part of construction element of the projection lens in accordance with information representative of the focusing state transmitted from the remote controller so as to focus the image projected onto the screen.

7. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, wherein the remote controller has: an imaging device; a distortion detection section in which an image on a screen projected from the projector main frame is formed on the imaging device to obtain an image signal representative of the image, and a keystone distortion of the image on the screen is detected in accordance with the image signal; and a distortion state transmission section for transmitting to the projector main frame information representative of a keystone distortion state detected by the distortion detection section, and wherein the projector main frame has a keystone correction section for correcting the keystone distortion of the image on the screen.

8. A projector according to claim 7, wherein the keystone correction section corrects the keystone distortion of the image on the screen based on the information representative of a keystone distortion state, the information being transmitted from the remote controller.

9. A projector comprising: a projector main frame having a memory for storing an image in form of data and a projection lens for projecting the image, in which the image stored in the memory is read and visualized, so that the visualized image is projected via the projection lens onto a screen; and a remote controller for performing a remote control of the projector main frame, wherein the projector main frame has a remote controller mounting section for detachably mounting the remote controller at a position that the mounted remote controller covers the front of the projection lens of the projector main frame, and wherein the projector main frame includes a light source lamp that emits light with which the projector main frame projects the image via the projection lens onto the screen, and the projector has a power source control section in which when the remote controller is mounted on the remote controller mounting section, a power supply to the light source lamp is turned off.

* * * * *